(12) United States Patent
Ishikawa et al.

(10) Patent No.: US 10,487,781 B2
(45) Date of Patent: Nov. 26, 2019

(54) EXHAUST HEAT RECOVERY DEVICE

(71) Applicant: FUTABA INDUSTRIAL CO., LTD., Okazaki-shi, Aichi (JP)

(72) Inventors: Hiromi Ishikawa, Okazaki (JP); Naohiro Takemoto, Okazaki (JP)

(73) Assignee: FUTABA INDUSTRIAL CO., LTD., Okazaki-shi, Aichi (JP)

( * ) Notice: Subject to any disclaimer, the term of this patent is extended or adjusted under 35 U.S.C. 154(b) by 0 days.

(21) Appl. No.: 15/761,360

(22) PCT Filed: Jan. 22, 2016

(86) PCT No.: PCT/JP2016/051913
§ 371 (c)(1),
(2) Date: Mar. 19, 2018

(87) PCT Pub. No.: WO2017/126117
PCT Pub. Date: Jul. 27, 2017

(65) Prior Publication Data
US 2018/0274495 A1  Sep. 27, 2018

(51) Int. Cl.
*F01N 3/02* (2006.01)
*F02M 26/24* (2016.01)
(Continued)

(52) U.S. Cl.
CPC ............ *F02M 26/24* (2016.02); *F01K 23/10* (2013.01); *F01N 5/02* (2013.01); *F02M 26/14* (2016.02);
(Continued)

(58) Field of Classification Search
CPC .......... F01N 3/0205; F01N 5/02; F01N 5/025; F01N 2240/02; F02M 26/22; F02M 26/24; F02M 26/25
See application file for complete search history.

(56) References Cited

U.S. PATENT DOCUMENTS 7,461,641 B1 * 12/2008 Styles .................... F02M 26/19
                                                123/568.12
2008/0264609 A1 * 10/2008 Lutz ...................... F28D 7/0091
                                                165/104.19
(Continued)

FOREIGN PATENT DOCUMENTS

CN     105089752 A      11/2015
FR       2876417 A1 *   4/2006  ............. B60H 1/323
(Continued)

OTHER PUBLICATIONS

Machine translation of FR-2876417-A1, dated Mar. 27, 2019.*
(Continued)

*Primary Examiner* — Jonathan R Matthias
(74) *Attorney, Agent, or Firm* — Withrow & Terranova, P.L.L.C.; Vincent K. Gustafson

(57) ABSTRACT

An exhaust heat recovery device according to one aspect of the present disclosure includes a main flow path, a secondary flow path, a plurality of heat exchangers, and a communication portion. Exhaust gas flows in the main flow path. The secondary flow path is a flow path branched from the main flow path, and at least a portion of the exhaust gas flows in the secondary flow path. The plurality of heat exchangers are arranged in the secondary flow path. The communication portion communicates with the plurality of heat exchangers and constitutes a portion of the secondary flow path. The communication portion is provided with an exhaust gas outlet which is an outlet for exhaust gas used for exhaust gas recirculation.

13 Claims, 2 Drawing Sheets

(51) Int. Cl.
  *F01N 5/02* (2006.01)
  *F02M 26/14* (2016.01)
  *F02M 26/22* (2016.01)
  *F02M 26/28* (2016.01)
  *F01K 23/10* (2006.01)
  *F01N 3/24* (2006.01)

(52) U.S. Cl.
  CPC ............ *F02M 26/22* (2016.02); *F02M 26/28* (2016.02); *F01N 3/24* (2013.01); *F01N 2240/02* (2013.01); *F01N 2240/36* (2013.01)

(56) References Cited

U.S. PATENT DOCUMENTS

2012/0102934 A1\* 5/2012 Magnetto ............... F01M 5/001
  60/320
2015/0333245 A1 11/2015 Iriyama

FOREIGN PATENT DOCUMENTS

| JP | 2009-127547 A | 6/2009 | |
|---|---|---|---|
| JP | 2009-138615 A | 6/2009 | |
| JP | 2015-220275 A | 12/2015 | |
| KR | 101230485 B1 | 2/2013 | |
| WO | WO-2010114431 A1 \* | 10/2010 | ............. F02M 26/05 |

OTHER PUBLICATIONS

Notification of Reasons for Refusal for Japanese Patent Application No. 2017-562407, dated Oct. 23, 2018, 7 pages.
Notification of Transmittal of Translation of the International Preliminary Report on Patentability, and International Preliminary Report on Patentability (Chapter I of Patent Cooperation Treaty) for International Application No. PCT/JP2016/051913 (Forms PCT/IB/338, PCT/IB/373, and PCT/ISA/237), dated Aug. 2, 2018 (8 pages).
International Search Report for International Patent Application No. PCT/JP2016/051913 (Form PCT/ISA/210), dated Apr. 12, 2016 (2 pages including English translation).
Notification of Reasons for Refusal for Japanese Patent Application No. 2017-562407, dated Jun. 26, 2018, 7 pages.
First Office Action for Chinese Patent Application No. 201680055010.2, dated Jul. 5, 2019, 12 pages including English translation.

\* cited by examiner

US 10,487,781 B2

EXHAUST HEAT RECOVERY DEVICE

CROSS-REFERENCE TO RELATED APPLICATION(S)

This application is a 35 U.S.C. § 371 national phase filing of International Application No. PCT/JP2016/051913 filed Jan. 22, 2016, wherein the disclosure of the foregoing application is hereby incorporated by reference herein in its entirety.

TECHNICAL FIELD

The present disclosure relates to a technique for recovering heat from exhaust gas using a heat exchanger.

BACKGROUND ART

The following Patent Document 1 discloses an exhaust heat recovery device for recovering heat from exhaust gas using a heat exchanger, in which a gas flow path inside the heat exchanger is branched to provide an exhaust gas extraction section.

PRIOR ART DOCUMENTS

Patent Documents

Patent Document 1: Japanese Unexamined Patent Application Publication No. 2009-127547

SUMMARY OF THE INVENTION

Problems to be Solved by the Invention

However, in the exhaust heat recovery device described above, when changing the position of the exhaust gas extraction section, it is necessary to change the design such as arrangement of a liquid flow path of the heat exchanger, and there has been a problem that cost increases when changing the position of the exhaust gas extraction section.

In one aspect of the present disclosure, it is desirable that the position of the exhaust gas extraction section can be easily changed in the technique for recovering heat from exhaust gas using a heat exchanger.

Means for Solving the Problems

An exhaust heat recovery device according to one aspect of the present disclosure comprises a main flow path, a secondary flow path, a plurality of heat exchangers, and a communication portion. Exhaust gas flows in the main flow path. The secondary flow path is a flow path branched from the main flow path, and at least a portion of the exhaust gas flows in the secondary flow path.

The plurality of heat exchangers are arranged in the secondary flow path. The communication portion communicates with the plurality of heat exchangers and constitutes a portion of the secondary flow path. Further, the communication portion is provided with an exhaust gas outlet, which is an outlet for exhaust gas used for exhaust gas recirculation.

Since such an exhaust heat recovery device is provided with the exhaust gas outlet in the communication portion communicating with the plurality of heat exchangers, the position of the exhaust gas outlet can be changed without changing the design of the heat exchanger.

In the exhaust heat recovery device according to one aspect of the present disclosure, the plurality of heat exchangers may comprise a liquid flow path through which a liquid to be heat-exchanged with exhaust gas flows, and the exhaust gas may be allowed to pass around the liquid flow path.

According to such an exhaust heat recovery device, it is possible to provide a water-cooled heat exchanger by providing a liquid flow path for causing a liquid such as water to flow in the heat exchanger.

Further, in the exhaust heat recovery device according to one aspect of the present disclosure, among the plurality of heat exchangers, the heat exchanger to which exhaust gas is supplied directly from at least the main flow path may be provided with a discharge portion through which a coolant is discharged in the liquid flow path and a supply portion which is disposed closer to the main flow path side than the discharge portion and through which the coolant is supplied in the liquid flow path.

According to such an exhaust heat recovery device, since the supply portion is disposed closer to the main flow path side than the discharge portion, the heat exchanger can carry out heat exchange by using a lower temperature coolant for high temperature exhaust gas flowing in from the main flow path.

Further, in the exhaust heat recovery device according to one aspect of the present disclosure, among the plurality of heat exchangers, in the heat exchanger located on an upstream side in a flow direction of the exhaust gas in the main flow path, the heat exchange capacity may be set to be higher than that of the heat exchanger located on a downstream side in the flow direction of the exhaust gas in the main flow path.

According to such an exhaust heat recovery device, since the heat exchange capacity of the heat exchanger carrying out heat exchange with higher temperature exhaust gas is set high, it is possible to efficiently cool exhaust gas until the exhaust gas reaches the communication portion.

Further, in the exhaust heat recovery device according to one aspect of the present disclosure, the secondary flow path may be set such that the flow direction of the exhaust gas at a portion where the heat exchanger is disposed is orthogonal to the flow direction of the exhaust gas in the main flow path.

According to such an exhaust heat recovery device, the main flow path and the heat exchanger can be arranged adjacent to each other, and an exhaust gas inlet in the heat exchanger can be disposed just next to the main flow path; therefore, a path for introducing exhaust gas into the heat exchanger can be eliminated, so that the device can be miniaturized.

EXPLANATION OF REFERENCE NUMERALS

1 . . . exhaust heat recovery device, 8 . . . inflow portion, 9 . . . outflow portion, 10A, 10B . . . valve, 12 . . . exhaust pipe, 14 . . . increased width portion, 30 . . . heat exchange unit, 30A, 30B . . . heat exchanger, 31A, 31B . . . heat exchange fin, 32, 33, 34 . . . liquid flow path, 44 . . . inflow pipe, 46 . . . outflow pipe, 56 . . . separation wall, 71 . . . exhaust gas outlet, 72 . . . EGR pipe, 75 . . . communication portion, 91 . . . main flow path, 92 . . . secondary flow path, 142 . . . exhaust gas, 144 . . . coolant.

MODE FOR CARRYING OUT THE INVENTION

Hereinafter, exemplary embodiments of the present disclosure will be described with reference to the drawings.

1. First Embodiment

[1-1. Overview of Exhaust Heat Recovery Device]

Figure 1:
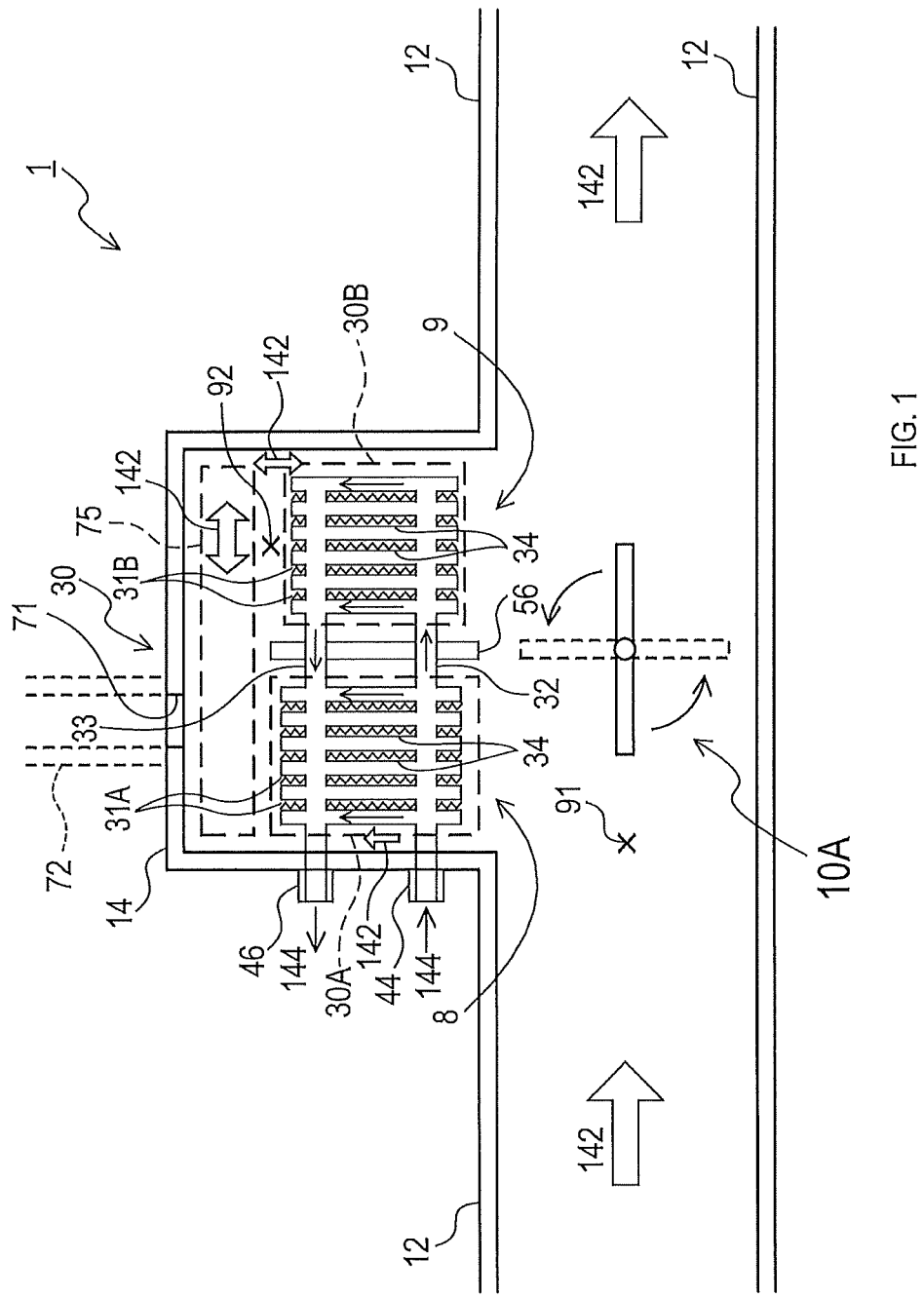
FIG. 1 is a cross-sectional view showing an exhaust heat recovery device according to an embodiment.

An exhaust heat recovery device 1 shown in FIG. 1 is installed in a moving object having an internal combustion engine, such as a passenger car. The exhaust heat recovery device 1 recovers heat from exhaust gas 142, such as exhaust gas from an internal combustion engine, which is a high temperature fluid, by transferring heat of the exhaust gas 142 to a coolant 144 of the internal combustion engine, which is a low temperature fluid lower in temperature than the exhaust gas 142. The coolant 144 in the present embodiment may be cooling water or oil liquid.

The exhaust heat recovery device 1 of the present embodiment comprises an exhaust pipe 12, a heat exchange unit 30, and a valve 10A.

The exhaust pipe 12 forms a flow path that guides the exhaust gas 142 from the internal combustion engine to the downstream side. The exhaust pipe 12 is provided with an increased width portion 14 whose cross-sectional area is larger than the surrounding pipe. In the increased width portion 14, the heat exchange unit 30 is disposed.

In the increased width portion 14, an inflow portion 8 and an outflow portion 9 are arranged adjacent to each other.

The inflow portion 8 is a portion where the exhaust gas 142 flows from the exhaust pipe 12 into the heat exchange unit 30. The outflow portion 9 is a portion where the exhaust gas 142 flows out from the heat exchange unit 30 to the exhaust pipe 12. The valve 10A is a valve that opens or closes the flow path for the exhaust gas 142. The valve 10A is located downstream of the inflow portion 8 along the flow path for the exhaust gas 142 in the discharge pipe 12 and disposed at a position between the plurality of heat exchangers 30A and 30B, described below, in a main flow path 91.

When the valve 10A is opened, most of the exhaust gas 142 does not pass through the heat exchange unit 30 but passes through the main flow path 91 to flow downstream of the valve 10A. When the valve 10A is closed, most of the exhaust gas 142 passes through a secondary flow path 92 passing through the heat exchange unit 30 to flow downstream of the valve 10A. That is, the valve 10A switches the flow path for the exhaust gas 142 according to opening and closing.

The valve 10A is opened and closed by an actuator such as a well-known motor or thermoactuator. The valve 10A also has a characteristic of being opened and closed by the pressure of the exhaust gas 142. The main flow path 91 represents the flow path for the exhaust gas 142 formed mainly by the exhaust pipe 12. The secondary flow path 92 is a flow path branched from the main flow path 91 and mainly represents a flow path surrounded by the increased width portion 14 and a separation wall 56 described below.

[1-2. Structure of Exhaust Heat Recovery Device]

The exhaust pipe 12 is formed in a cylindrical shape with both ends opened, for example. The exhaust pipe 12 is connected to an exhaust pipe, an exhaust manifold or the like into which the exhaust gas 142 from the internal combustion engine flows. The exhaust pipe 12 may have any cross-sectional shape such as a rectangular shape.

The heat exchanger 30 comprises the plurality of heat exchangers 30A and 30B, the separation wall 56, and a communication portion 75. The separation wall 56 is disposed between the plurality of heat exchangers 30A and 30B so as to separate the heat exchangers 30A and 30B from each other, and functions as a wall surface for partitioning a space so as to prevent the exhaust gas 142 flowing through the heat exchangers 30A and 30B from being mixed. The heat exchanger 30A is a heat exchanger disposed on the upstream side in the secondary flow path 92, and exhaust gas is directly supplied from the main flow path 91.

In the present disclosure, the description "directly supplied" indicates that exhaust gas is supplied from the main flow path 91 without passing through the other heat exchanger 30B. The upstream side indicates an upstream side in a direction in which the exhaust gas 142 flows in a state where an EGR valve, described below, is closed.

The heat exchanger 30A comprises heat exchange fins 31A and liquid flow paths 32, 33, and 34. The heat exchanger 30B is a heat exchanger disposed downstream of the heat exchanger 30A and the communication portion 75 in the secondary flow path 92. The heat exchanger 30B comprises heat exchange fins 31B and liquid flow paths 32, 33, and 34.

The liquid flow path 32 is disposed closer to the main flow path 91 side than the liquid flow path 33 and is disposed closer to the side of an inflow pipe 44 to which the coolant 144 is supplied than an outflow pipe 46 through which the coolant 144 is discharged. On the other hand, the liquid flow path 33 is disposed on the side opposite to the main flow path 91 with respect to the liquid flow path 32 and is disposed closer to the side of the outflow pipe 46 than the inflow pipe 44. A large number of the liquid flow paths 34 are provided, and the liquid flow paths 34 are connected to the liquid flow path 33 while branching the liquid flow path 32.

The heat exchange fins 31A and 31B are well-known fins provided for efficiently exchanging heat with a liquid such as the coolant 144 flowing through the liquid flow paths 32, 33, and 34. In the heat exchanger 30A disposed upstream of the exhaust gas 142 in the secondary flow path 92, the heat exchange capacity is set to be higher than that of the heat exchanger 30B disposed downstream thereof. The heat exchange capacity represents a magnitude of a heat exchange amount per unit time and unit heat quantity.

Specifically, for example, a surface area of the heat exchange fin 31A is made larger than a surface area of the heat exchange fin 31B, and in the example shown in FIG. 1, a length of the heat exchange fin 31A is set longer than a length of the heat exchange fin 31B. The liquid flow path 32 in the heat exchange fin 31A is disposed closer to the inflow pipe 44 than the liquid flow path 32 in the heat exchanger 30B. Thus, the coolant 144 having a temperature lower than that of the heat exchanger 30B is supplied, and the heat exchange capacity is improved.

In the heat exchangers 30A and 30B, the exhaust gas 142 flows around the liquid flow paths 32, 33, and 34 and the heat exchange fins 31A and 31B.

The communication portion 75 has a space for communicating the plurality of heat exchangers 30A and 30B on the side opposite to the main flow path 91 of the plurality of heat exchangers 30A and 30B and constitutes a portion of the secondary flow path 92. The term "communication" indicates that a plurality of spaces are in a continuous state. In the present embodiment, a state where spaces for passing the exhaust gas 142 of the heat exchangers 30A and 30B are connected to each other is shown.

The secondary flow path 92 is set such that the flow direction of the exhaust gas 142 at the portion where the heat exchangers 30A and 30B are arranged is orthogonal to the flow direction of the exhaust gas in the main flow path 91. That is, in the heat exchanger 30A, the exhaust gas 142 flowing through the main flow path 91 changes its direction by about 90 degrees to flow therein, and changes its direction by 180 degrees in the communication portion 75.

In the heat exchanger 30B, the exhaust gas 142 flows toward the main flow path 91 so as to be orthogonal to the exhaust gas 142 flowing through the main flow path 91. In the present disclosure, the term "orthogonal" is a concept including not only a case where exhaust gases are perfectly orthogonal but also such angles that approximately the same action and effect can be obtained, such as approximately orthogonal.

In the communication portion 75, an exhaust gas outlet 71, which is an outlet for exhaust gas used for exhaust gas recirculation (EGR), is formed in communication with the communication portion 75. That is, in the increased width portion 14, the exhaust gas outlet 71 is formed, and an EGR pipe 72 is connected thereto.

The coolant 144 flows into the heat exchanger 30 from the inflow pipe 44 penetrating the increased width portion 14, and after heat exchange is carried out inside the heat exchanger 30, the coolant 144 flows outside the heat exchanger 30 via the outflow pipe 46 penetrating the increased width portion 14.

In the EGR pipe 72, a well-known EGR valve (not shown) is provided, and when the EGR valve is opened, a portion of the exhaust gas 142 flows into the EGR pipe 72. In particular, when the valve 10A provided in the main flow path 91 is closed, the exhaust gas 142 having passed through the heat exchanger 30A and having been cooled is supplied to the EGR pipe 72. When the valve 10A provided in the main flow path 91 is open, the exhaust 142 that has passed through the heat exchanger 30A and the exhaust 142 that flows backward from the downstream side of the valve 10A and has passed through the heat exchanger 30B are supplied to the EGR pipe 72. That is, the exhaust gas 142 cooled by using the plurality of heat exchangers 30A and 30B is supplied to the EGR pipe 72.

[1-3. Effects]

According to the first embodiment detailed above, the following effects can be obtained.

(1a) The exhaust heat recovery device 1 described above comprises the main flow path 91, the secondary flow path 92, the plurality of heat exchangers 30A and 30B, and the communication portion 75. Exhaust gas flows in the main flow path 91. The secondary flow path 92 is a flow path branched from the main flow path 91, and at least a portion of the exhaust gas flows in the secondary flow path 92.

The plurality of heat exchangers 30A and 30B are arranged in the secondary flow path 92. The communication portion 75 communicates with the plurality of heat exchangers 30A and 30B and constitutes a portion of the secondary flow path 92. Further, the communication portion 75 is formed with the exhaust gas outlet 71 which is an outlet for exhaust gas used for exhaust gas recirculation.

According to the exhaust heat recovery device 1 thus configured, since the exhaust gas outlet 71 is provided at the communication portion 75 communicating with the plurality of heat exchangers 30A and 30B, the position of the exhaust gas outlet 71 can be changed without changing the design of the heat exchangers 30A and 30B.

(1b) In the exhaust heat recovery device 1 described above, the plurality of heat exchangers 30A and 30B comprise the liquid flow paths 32, 33, and 34 through which a liquid to be heat-exchanged with exhaust gas flows, and the exhaust gas is allowed to pass around the liquid flow paths 32, 33, and 34.

According to the exhaust heat recovery device 1 thus configured, it is possible to provide the water-cooled heat exchangers 30A and 30B by providing the liquid flow paths 32, 33, and 34 in the heat exchangers 30A and 30B.

(1c) In the exhaust heat recovery device 1 described above, among the plurality of heat exchangers 30A and 30B, the heat exchanger 30A to which exhaust gas is supplied directly from at least the main flow path 91 is provided with the outflow pipe 46 through which a coolant is discharged in the liquid flow path 33 and the inflow pipe 44 which is disposed closer to the main flow path 91 side than the outflow pipe 46 and through which the coolant is supplied in the liquid flow path 32.

According to the exhaust heat recovery device 1 thus configured, since the inflow pipe 44 is disposed closer to the main flow path 91 side than the outflow pipe 46, the heat exchangers 30A and 30B can carry out heat exchange by using a lower temperature coolant for high temperature exhaust gas flowing in from the main flow path 91.

(1d) In the exhaust heat recovery device 1 as described above, among the plurality of heat exchangers 30A and 30B, in the heat exchanger 30A located on the upstream side in the flow direction of exhaust gas in the main flow path 91, the heat exchange capacity is set to be higher than that of the heat exchanger 30B located on the downstream side in the flow direction of the exhaust gas in the main flow path 91.

According to the exhaust heat recovery device 1 thus configured, since the heat exchange capacity of the heat exchanger 30A carrying out heat exchange with higher temperature exhaust gas is set high, it is possible to efficiently cool exhaust gas until the exhaust gas reaches the communication portion 75.

(1e) In the exhaust heat recovery device 1 described above, the secondary flow path 92 is set such that the flow direction of the exhaust gas at the portion where the heat exchangers 30A and 30B are arranged is orthogonal to the flow direction of the exhaust gas in the main flow path 91.

According to the exhaust heat recovery device 1 thus configured, the main flow path 91 and the heat exchangers 30A and 30B are arranged adjacent to each other, and each exhaust gas inlet in the heat exchangers 30A and 30B can be disposed just next to the main flow path 91; therefore, a path for introducing exhaust gas into the heat exchangers 30A and 30B can be eliminated, so that the device can be designed to be smaller.

(1f) In the exhaust heat recovery device 1 described above, the valve 10A is disposed at the position between the plurality of heat exchangers 30A and 30B in the main flow path 91. In other words, the inflow portion 8 from the main flow path 91 to the secondary flow path 92 and the outflow portion 9 from the secondary flow path 92 to the main flow path 91 are arranged adjacent to each other, and the valve 10A is disposed at a position between the inflow portion 8 and the outflow portion 9 in the main flow path 91.

According to the exhaust heat recovery device 1 as described above, when the valve 10A is opened, it is possible to increase the amount of the exhaust gas 142 supplied from the outflow portion 9 to the EGR pipe 72 via the heat exchanger 30B on the downstream side. Thus, the exhaust gas 142 supplied to the EGR pipe 72 can be efficiently cooled.

2. Another Embodiment

Although the embodiment for carrying out the present disclosure has been described above, the present disclosure is not limited to the above-described embodiment, and various modifications can be made.

Figure 2:
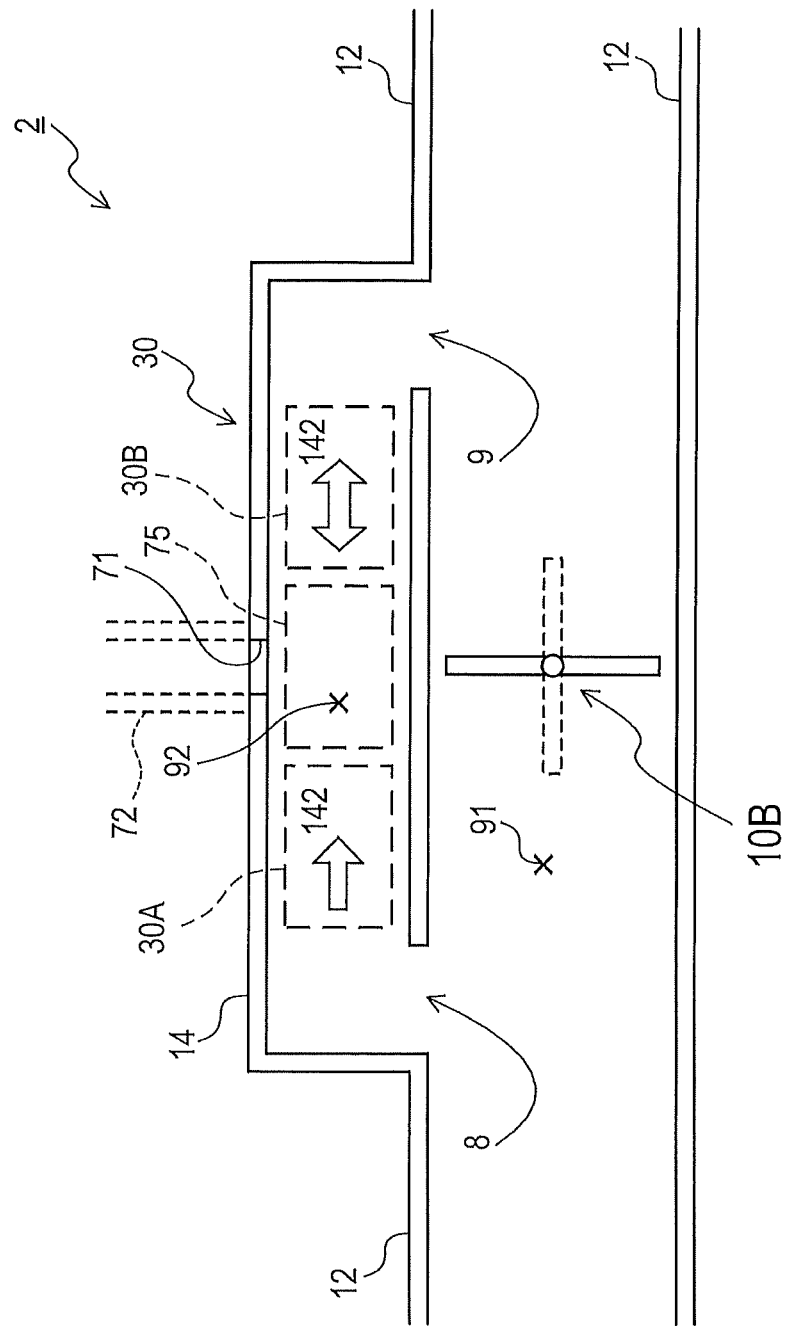
FIG. 2 is a cross-sectional view showing an exhaust heat recovery device according to another embodiment.

(2a) In the above embodiment, although the communication portion 75 is provided on the side opposite to the main flow path 91 of the plurality of heat exchangers 30A and 30B, the present disclosure is not limited thereto. For example, as shown in FIG. 2, the plurality of heat exchangers 30A and 30B may be arranged side by side along an exhaust flow direction 142 in the main flow path 91, and the communication portion 75 may be formed between the heat exchangers 30A and 30B. Also in this case, the communication portion 75 is formed with an exhaust gas outlet 71. In the main flow path 91, it is preferable that a valve 10B equivalent to the valve 10A is disposed at a position between an inflow portion 8 and an outflow portion 9.

(2b) The configuration of the plurality of heat exchangers 30A and 30B can be a well-known configuration or any configuration. For example, in the above embodiment, although the plurality of heat exchangers 30A and 30B are provided with the heat exchange fins 31A and 31B, the heat exchange fins 31A and 31B may not be provided if heat exchange between the coolant and the exhaust gas 142 can be carried out. In the plurality of heat exchangers 30A and 30B, well-known configurations such as those not branching the liquid flow paths 32 and 33 may be used in combination. Even in such a case, the same effect as in (1a) described above can be obtained.

(2c) The functions of one constituent element in the above embodiment may be dispersed as a plurality of constituent elements, or the functions of a plurality of constituent elements may be integrated to one constituent element. Further, some configurations of the above embodiment may be omitted. Furthermore, at least some configurations of the above embodiment may be added to or replace configurations of another above-described embodiment. All aspects included in the technical concept identified solely by the expressions recited in the claims are embodiments of the present disclosure.

(2d) In addition to the exhaust heat recovery device 1 described above, the present disclosure can be realized in various forms such as a system including the exhaust heat recovery device 1 as a component and an exhaust heat recovery method.

3. Correspondence Relationship Between Configuration of the Present Embodiment and Configuration of the Present Disclosure The inflow pipe 44 in the above embodiment corresponds to an example of a supply portion according to the present disclosure, and the outflow pipe 46 in the above embodiment corresponds to an example of a discharge portion according to the present disclosure.

The invention claimed is:

1. An exhaust heat recovery device comprising:
a main flow path configured to allow exhaust gas to flow therethrough;
a secondary flow path that is a flow path branching from the main flow path and returning to the main flow path, the secondary flow path being configured to allow a portion of the exhaust gas to flow therethrough;
a first heat exchanger and a second heat exchanger arranged in the secondary flow path, and the second heat exchanger being arranged downstream of the first heat exchanger relative to a flow of the portion of the exhaust gas through the secondary flow path;
a communication portion configured to communicate with the first heat exchanger and the second heat exchanger and constituting a portion of the secondary flow path; and
a valve disposed in the main flow path at a position aligned with a boundary between the first heat exchanger and the second heat exchanger, the valve being configured such that most of the exhaust gas passes through the main flow path when the valve is opened, while a part of the exhaust gas passes through the main flow path when the valve is closed;
wherein the communication portion comprises an exhaust gas outlet configured to supply exhaust gas to an exhaust gas recirculation conduit.

2. The exhaust heat recovery device according to claim 1, wherein each of the first heat exchanger and the second heat exchanger comprises at least one liquid flow path configured such that a liquid to be heat-exchanged with the exhaust gas flows therethrough, and each of the first heat exchanger and the second heat exchanger is configured to allow the exhaust gas to pass around the at least one liquid flow path.

3. The exhaust heat recovery device according to claim 2, wherein the first heat exchanger is arranged to receive the exhaust gas directly from at least the main flow path, and the first heat exchanger further comprises:
a discharge portion configured to allow a coolant to be discharged in the at least one liquid flow path of the first heat exchanger; and
a supply portion disposed closer to the main flow path than to the discharge portion, and configured to allow the coolant to be supplied in the at least one liquid flow path of the first heat exchanger.

4. The exhaust heat recovery device according to claim 3, wherein the first heat exchanger has a heat exchange capacity set to be higher than that of the second heat exchanger.

5. The exhaust heat recovery device according to claim 4, wherein the secondary flow path is configured to cause exhaust gas to flow through the first heat exchanger and the second heat exchanger in a direction orthogonal to a flow direction of the exhaust gas in the main flow path.

6. The exhaust heat recovery device according to claim 3, wherein the secondary flow path is configured to cause exhaust gas to flow through the first heat exchanger and the second heat exchanger in a direction orthogonal to a flow direction of the exhaust gas in the main flow path.

7. The exhaust heat recovery device according to claim 2, wherein the first heat exchanger has a heat exchange capacity set to be higher than that of the second heat exchanger.

8. The exhaust heat recovery device according to claim 7, wherein the secondary flow path is configured to cause exhaust gas to flow through the first heat exchanger and the second heat exchanger in a direction orthogonal to a flow direction of the exhaust gas in the main flow path.

9. The exhaust heat recovery device according to claim 2, wherein the secondary flow path is configured to cause exhaust gas to flow through the first heat exchanger and the second heat exchanger in a direction orthogonal to a flow direction of the exhaust gas in the main flow path.

10. The heat recovery device according to claim 1, wherein the first heat exchanger has a heat exchange capacity set to be higher than that of the second heat exchanger.

11. The exhaust heat recovery device according to claim 10, wherein the secondary flow path is configured to cause exhaust gas to flow through the first heat exchanger and the second heat exchanger in a direction orthogonal to a flow direction of the exhaust gas in the main flow path.

12. The exhaust heat recovery device according to claim 1, wherein the secondary flow path is configured to cause exhaust gas to flow through the first heat exchanger and the second heat exchanger in a direction orthogonal to a flow direction of the exhaust gas in the main flow path.

13. The exhaust heat recovery device according to claim 1, wherein the first heat exchanger comprises a first heat exchange fin, the second heat exchanger comprises a second heat exchange fin, the first heat exchange fin has a first length along a first flow of the portion of the exhaust gas through the first heat exchanger, the second heat exchange fin has a second length along a second flow of the portion of the exhaust gas through the second heat exchanger, and the first length is longer than the second length.

* * * * *